United States Patent [19]
Miller et al.

[11] Patent Number: 5,562,875
[45] Date of Patent: * Oct. 8, 1996

[54] HANDLING SYSTEM AND METHOD FOR CURVED EXTRUSIONS

[75] Inventors: William H. Miller, Wadsworth; James F. Stevenson, Hudson, both of Ohio

[73] Assignee: GenCorp Inc., Fairlawn, Ohio

[*] Notice: The portion of the term of this patent subsequent to Mar. 6, 2007, has been disclaimed.

[21] Appl. No.: 715,026

[22] Filed: Jun. 13, 1991

Related U.S. Application Data

[63] Continuation of Ser. No. 432,117, Nov. 6, 1989, abandoned, and a continuation-in-part of Ser. No. 207,838, Jun. 17, 1988, Pat. No. 4,906,171.

[51] Int. Cl.⁶ ................................................. B29C 47/24
[52] U.S. Cl. ................................ 264/177.16; 264/209.2; 264/209.8; 264/285; 264/339; 425/145; 425/381; 425/465; 425/466
[58] Field of Search .................... 425/131.5, 145, 425/381, 376, 382.3, 462, 465, 466, 192 R, 380, 325, 403.1, 133.1; 264/176.1, 177.1, 209.2, 209.8, 210.2, 142, 285, 295, 339, 177.16

[56] References Cited

U.S. PATENT DOCUMENTS

| | | | |
|---|---|---|---|
| 1,618,256 | 2/1927 | Wuthrich | 425/467 |
| 2,062,338 | 12/1936 | Tanzi | 425/467 |
| 2,679,964 | 6/1954 | Farmwald . | |
| 3,080,608 | 3/1963 | Van Riper | 425/466 |
| 3,093,860 | 6/1963 | Glersen | 425/466 |
| 3,111,714 | 11/1963 | Branscum et al. . | |
| 3,292,213 | 12/1966 | Donald et al. . | |
| 3,346,918 | 10/1967 | Deleuze et al. | 425/465 |
| 3,405,210 | 10/1968 | Heider . | |
| 3,425,092 | 2/1969 | Jun Taga | 425/380 |
| 3,490,113 | 1/1970 | Bulck et al. | 425/381 |
| 3,564,652 | 2/1971 | Baugnies et al. | 425/381 |
| 3,761,213 | 9/1973 | Wight | 425/465 |
| 3,809,519 | 5/1974 | Komaki . | |
| 3,822,777 | 7/1974 | Jepsen . | |
| 3,827,547 | 8/1974 | Nixon . | |
| 4,025,262 | 5/1977 | Furman | 425/466 |
| 4,056,591 | 11/1977 | Goettler et al. . | |
| 4,257,320 | 3/1981 | Holbrook et al. . | |

(List continued on next page.)

FOREIGN PATENT DOCUMENTS

| | | | |
|---|---|---|---|
| 2395123 | 2/1979 | France | 264/573 |
| 2359746 | 6/1974 | Germany | 264/295 |
| 2921943 | 12/1980 | Germany | 425/131.1 |
| 49-5903 | 2/1974 | Japan | 425/465 |
| 58-220717 | 12/1983 | Japan | 425/381 |
| 59-188424 | 10/1984 | Japan | 264/209.8 |
| 87-05258 | 9/1987 | WIPO | 425/131.1 |

OTHER PUBLICATIONS

Teito Rubber Advertisement–3 pages.

*Primary Examiner*—Mathieu D. Vargot
*Attorney, Agent, or Firm*—Robert F. Rywalski; Jeanne E. Longmuir; Frank C. Rote, Jr.

[57] ABSTRACT

An assembly and method for processing extrudate material containing curves or angles into a predetermined overall configuration, including having a die assembly for an extruder which assembly controls the cross-sectional shape or profile of the extrudate and selectively varies the path of the extrudate as it leaves the die assembly. A support member is provided which has a predetermined overall configuration and profile to receive the extrudate and maintain its configuration. A driving apparatus is also provided for continuously driving either the support member or the die assembly relative to the other while the extrudate is being received in the support member, and until the entire predetermined overall configuration has been completed. The path of the extrudate is variably directed by the die assembly as it leaves the extruder in coordination with the relative speeds involved to conform the extrudate configuration to the predetermined overall configuration of the support member.

10 Claims, 7 Drawing Sheets

U.S. PATENT DOCUMENTS

| | | | |
|---|---|---|---|
| 4,293,294 | 10/1981 | Rasmassuen | 425/382.3 |
| 4,442,131 | 4/1984 | Nagy et al. | 425/465 |
| 4,455,133 | 6/1984 | Jakob et al. | 264/167 |
| 4,461,738 | 6/1984 | Russell | 264/167 |
| 4,479,768 | 10/1984 | Kube et al. | 264/142 |
| 4,536,147 | 8/1985 | Groff . | |
| 4,648,821 | 3/1987 | Thurlin | 425/465 |
| 4,761,129 | 8/1988 | Aste et al. | 425/382.3 |
| 4,793,786 | 12/1988 | Greenhouse et al. . | |
| 4,832,960 | 5/1989 | Compagnon | 425/465 |
| 4,906,171 | 3/1990 | Miller | 425/381 |
| 4,929,167 | 5/1990 | Pepper | 425/325 |
| 5,069,853 | 12/1991 | Miller | 264/339 |

HANDLING SYSTEM AND METHOD FOR CURVED EXTRUSIONS

This is a continuation of application(s) Ser. No. 07/432,117 filed on Nov. 6, 1989, now abandoned, and a continuation-in-part of Ser. No. 07/207,838 filed Jun. 17, 1988, now U.S. Pat. No. 4,906,171.

TECHNICAL FIELD

The present invention relates to a system for handling extrusions as they exit an extruder apparatus, and specifically relates to a system for processing extrusions having defined cross-sectional shapes and defined longitudinal configurations with continuously extruded corners or curvatures.

BACKGROUND ART

Handling systems for receiving linear extrusions manufactured from a variety of materials are well known in the art. Continuous lines or conveyor belts, for example, are used to receive extrudate products discharged from extruders. Once the products are deposited on the conveyor, they may be transported to a next station in the manufacturing process, such as a storage location or curing oven. Typically, continuous linear extrudate exiting an extruder is deposited directly onto a continuously moving belt of the conveyor. Alternatively, the extrudate can be looped, as shown in U.S. Pat. No. 2,679,964, between the extruder and receiving apparatus.

To obtain products having configurations such as rectangular door seals or the like, individual lengths of linear extrudate were Joined at their respective ends to create corners or bends to form the final seal shape, such as by a separate molding step. This additional process step increased the time and expense of manufacture and created potential operational problems. Specifically, the corner junctions of the final product might be weaker than the component lengths, which could result in potential seal failure points, or the Junctions might have a deformed or distorted cross-sectional configuration relative to the cross section of the extrudate lengths which were unattractive in their appearance, and could cause a reduction in seal efficiency.

The discovery of a method and apparatus for continuously manufacturing curved or bent extrusions having undistorted cross-sectional shapes, as set forth in co-pending patent application Ser. No. 07/207,838 to Miller (assigned to the assignee of the present application), eliminated the problem of joining extrudate lengths to make curvatures or bends, but also identified a shortcoming of existing conventional handling systems when used to receive the curved extrudate. Depending on the size, shape or material of the product being extruded, existing receiving systems did not provide the handling structure necessary to properly support the curved extrusions.

Extrudate support structure is particularly important in the case of rubber or polymer extrusions for use in automotive and appliance applications, for example, automobile and refrigerator door seals. Such extrusions include curved cross-sectional and longitudinal configurations. The use of existing handling systems to receive such extruded products may distort the curvature or cross-sectional configuration of the extrusions. Unless the curved extrusions are properly supported during cooling or curing, the weight of the extrusion, or its contact with the receiving apparatus, may distort the curved configuration of the extrusion along both its length and cross-section.

DISCLOSURE OF INVENTION

The present invention provides a handling system for continuously processing an extruded form including angles curved sections, which system supports and maintains the configuration of the extruded form.

The handling system includes an extruder die subassembly for forming extrudate to a predetermined configuration, a support subassembly having a form for receiving, supporting and maintaining the extrudate in its cross-sectional shape or profile and its longitudinal form or configuration, and a drive subassembly to move the die and/or support subassemblies relative to the other during the extrusion operation.

The extruder die subassembly includes a die, a die feed and a curved extrudate generator, such as a flow director. The die has an adapted or recessed portion on one external surface for locating and engaging a portion of the support subassembly adjacent the die. The die feed is operatively interconnected with the die for supplying extrudate to the die. The flow director is movably mounted within the die to selectively control the path of extrudate flow, and thus the curvature of the extrudate, without changing the cross-sectional shape of the extrudate exiting the die. As specifically set forth in co-pending Miller patent application Ser. No. 07/207,838, using such a die permits selective and variable bending of the extrudate as it exits the die. The curvature in the extrudate is obtained using the flow director to angularly move an opening in the die with respect to an opening in the die feed. Using the flow director, the extrudate flow and the length of the pathways along which the extrudate flows, are selectively varied between the feed opening and the die opening to obtain the desired predetermined curved extrudate configuration. The movement of the flow director is coordinated with the movement and bends of the receiving form, to selectively shape the extrudate in a continuous process to conform the final configuration of the extrudate to the overall configuration of the support or receiving form. Other devices for generating curved extrudate are also known in the art.

The support subassembly includes a support channel or support member which approximately corresponds to the desired configuration of the extrusion. The support channel or member receives the extrusion as it exits the die. In the case of an inverted, generally U-shape seal having curved extrusion sections for use in sealing part or all of an automotive vehicle window, the longitudinal configuration of the support member conforms to the shape of the vehicle window frame which surrounds the three sides of the closed window.

During extrusion, the support member is positioned immediately adjacent to, and may be in contact with, the die. In this position, the extrusion is substantially immediately engaged with and supported by the support member as it exits the die, thus maintaining the cross-sectional and longitudinal configuration of the curved extrudate.

The handling system of the present invention further includes a drive subassembly. The drive subassembly is operatively interconnected with the extruder die subassembly or the support subassembly to continuously move either or both the extruder die or support subassembly relative to the other in a path allowing the shape of the receiving form to vary from one extrusion to another. Additionally, the drive assembly moves one or both of the interconnected extruder die or support subassembly relative to the other subassembly to maintain the movement of the movable subassembly in fixed relation to the movement of the exiting curved extrudate. The drive assembly is thus used to tension the extrudate as it exits the die, which eliminates or minimizes any buckling which might otherwise occur in the extrudate, and to properly position the extrudate exiting the die with respect to the support member, which increases the productivity of the system.

Three exemplary embodiments of the handling system of the present invention are disclosed in this application. In the first embodiment, the drive subassembly is interconnected with the support member or form of the support subassembly. During extrusion, the support member is thus moved with respect to the extruder die subassembly, and the curved extrusion is continuously received within or positioned upon the moving support member upon exiting the die.

In a second embodiment, first and second drive subassemblies are each interconnected with an extruder die and support subassembly simultaneously to move the subassemblies with respect to one another, and such that the curved extrusion is positioned on the movable support member as it exits the movable die.

In a third embodiment, the drive subassembly is interconnected with the extruder die subassembly. During extrusion, the die is moved with respect to the support subassembly to position the curved extrusion either internally or externally with respect to the support member as it exits the die.

These features and embodiments, as well as additional advantages of the present invention, will be better understood from the following detailed description and attached drawings setting forth in detail certain of the embodiments of the invention which include only a few of the various embodiments of the principles of the invention.

BEST MODE FOR CARRYING OUT THE INVENTION

Figure 1:
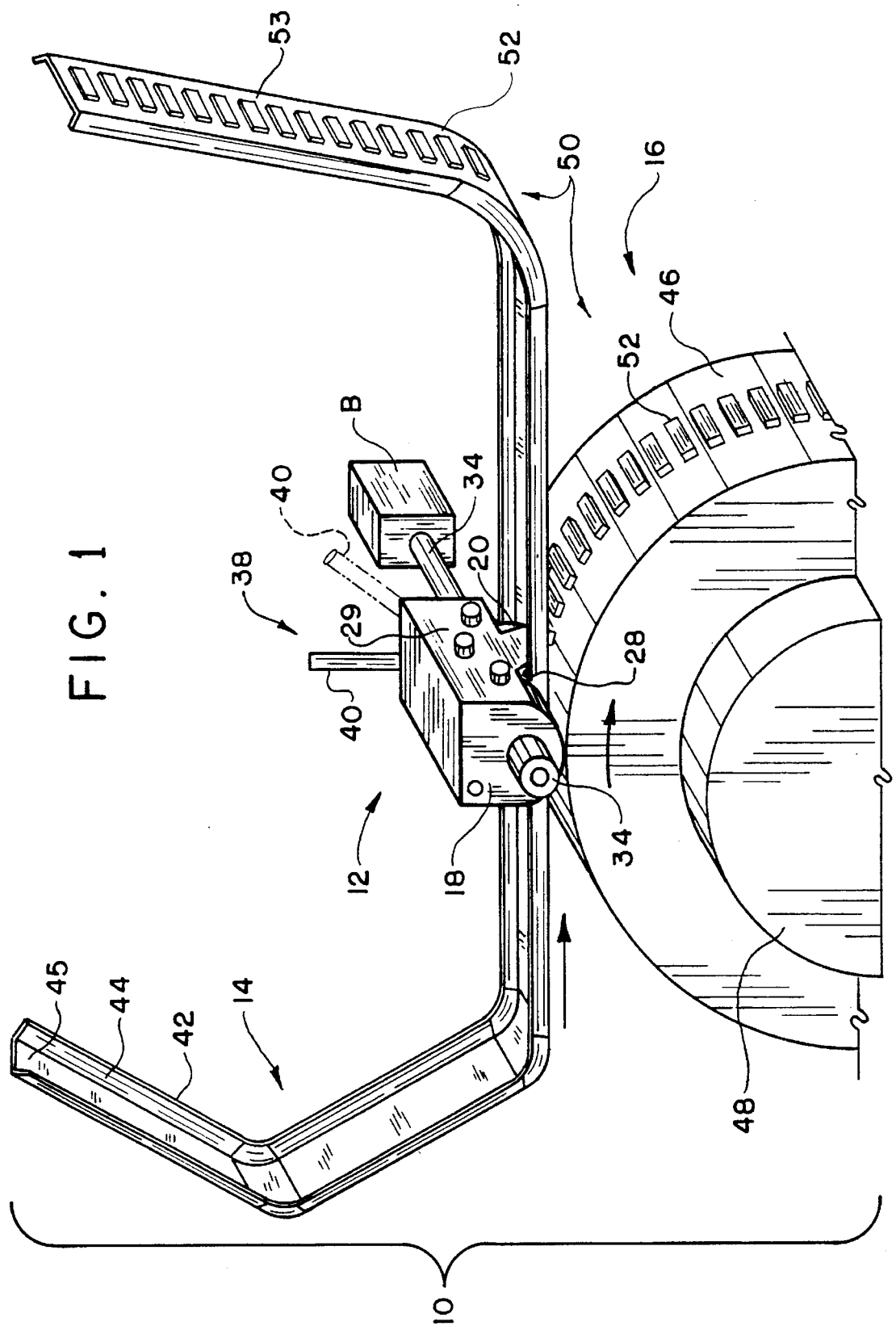
FIG. 1 is a perspective view of a die subassembly, support subassembly and drive subassembly of the handling system of the present invention.
Figure 3:
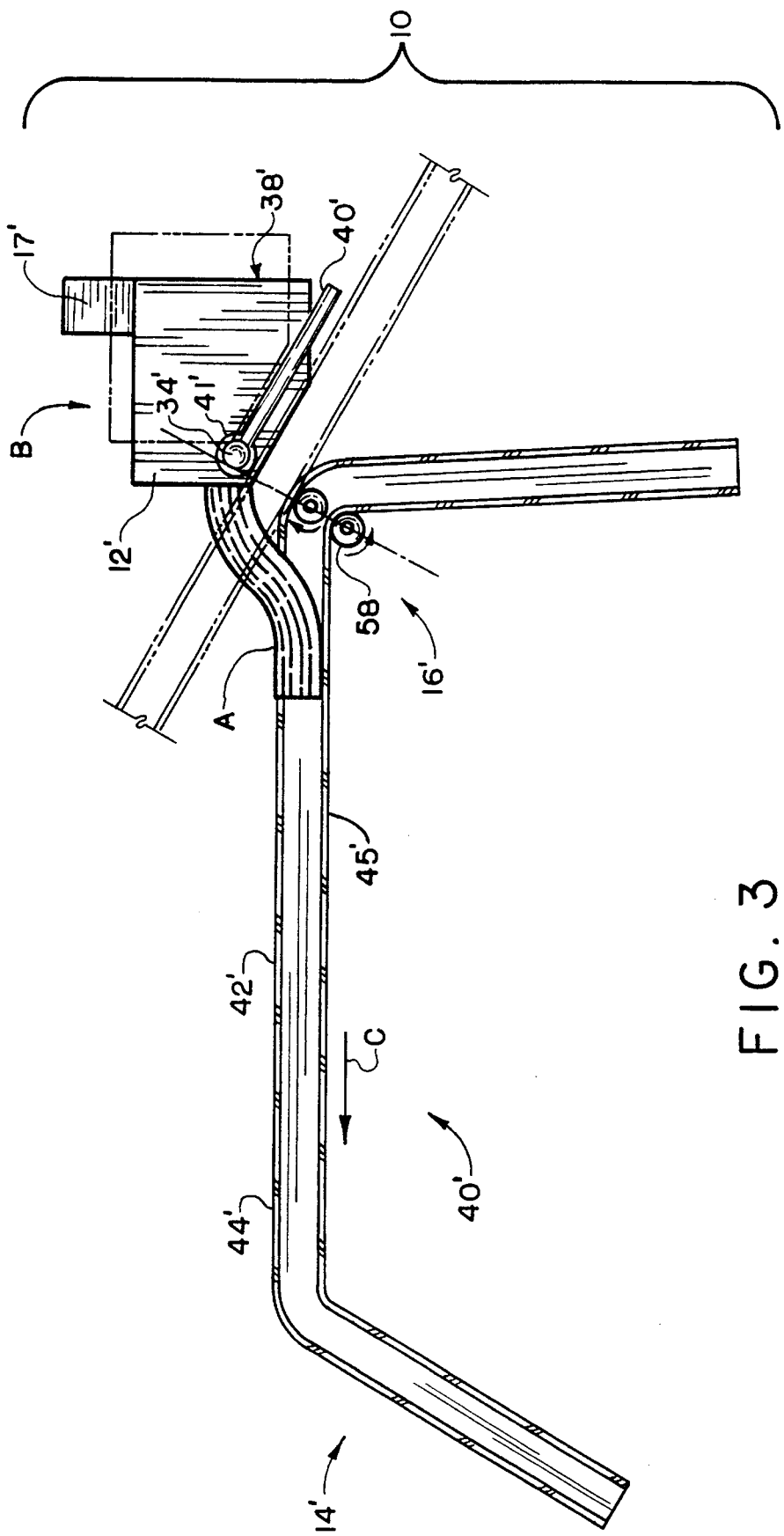
FIG. 3 is a schematic illustration of an alternative embodiment of a die subassembly, support subassembly and drive subassembly of the handling system of the present invention.
Figure 7:
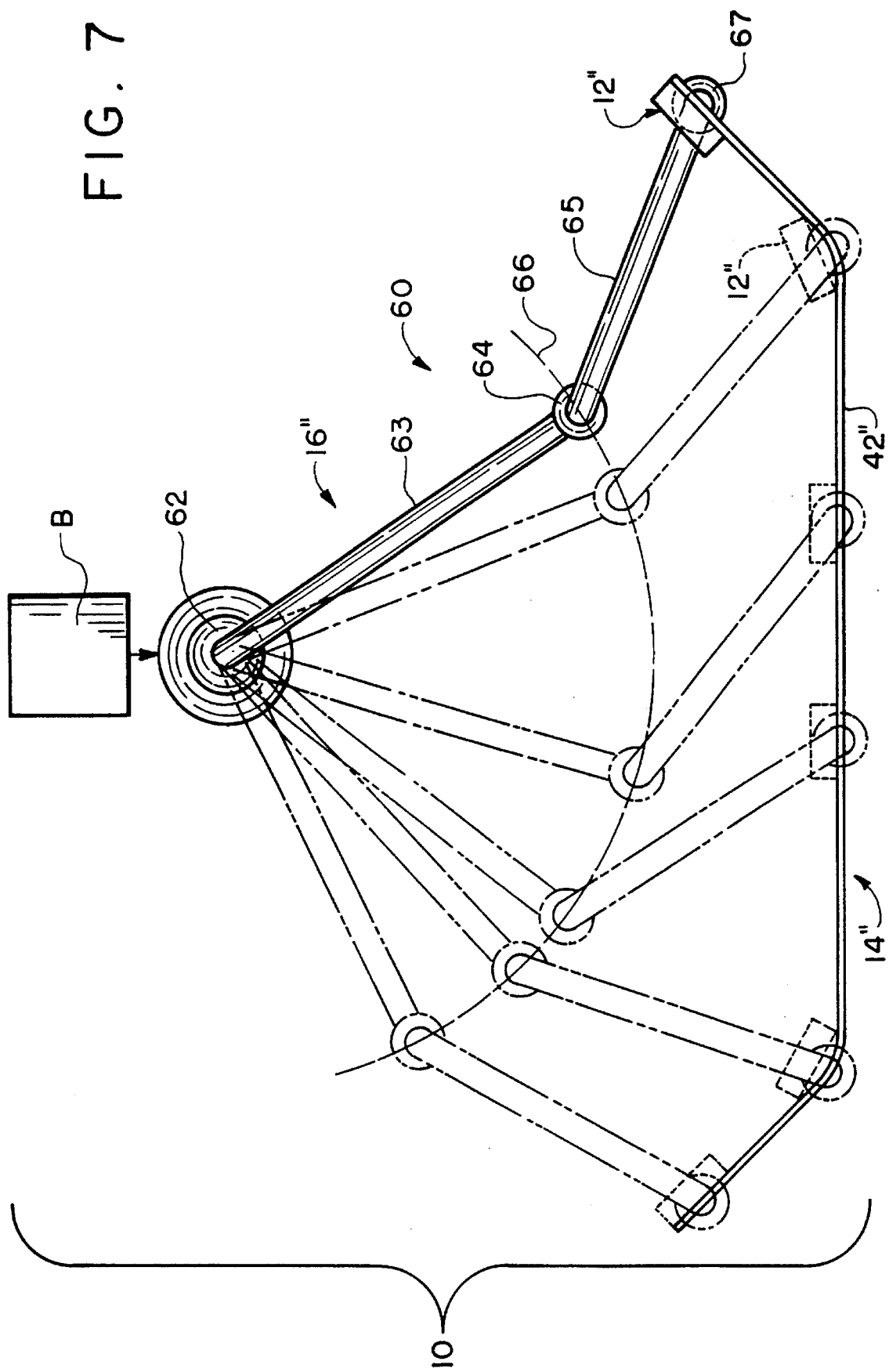
FIG. 7 is a schematic illustration of the movement of the die and drive subassemblies with respect to a support member, during operation of the handling system illustrated in FIG. 6.

Alternative assemblies, indicated generally at reference numeral 10, for handling and processing curved extrusions A into predetermined overall configurations in accordance with the present invention are illustrated in FIGS. 1, 3 and 7. Specifically, FIGS. 1, 3 and 7, illustrate three embodiments of the present invention. Where the structural elements are the same in these embodiments, the same reference numerals will be used, but with a prime designation being used with respect to the second embodiment, and a double prime designation being used when referring to the third embodiment.

An extruder B in conjunction with an extruder die subassembly 12, 12', 12" controls the extrudate profile and selectively varies the path and curvature of the extrudate. The assembly 10 further includes a support subassembly 14, 14', 14" with a predetermined overall form and cross-sectional shape for receiving the extrudate A. Finally, the assembly 10 includes a drive subassembly 16, 16', 16" for moving the die and/or support subassemblies relative to one another during extrusion.

Figure 2:
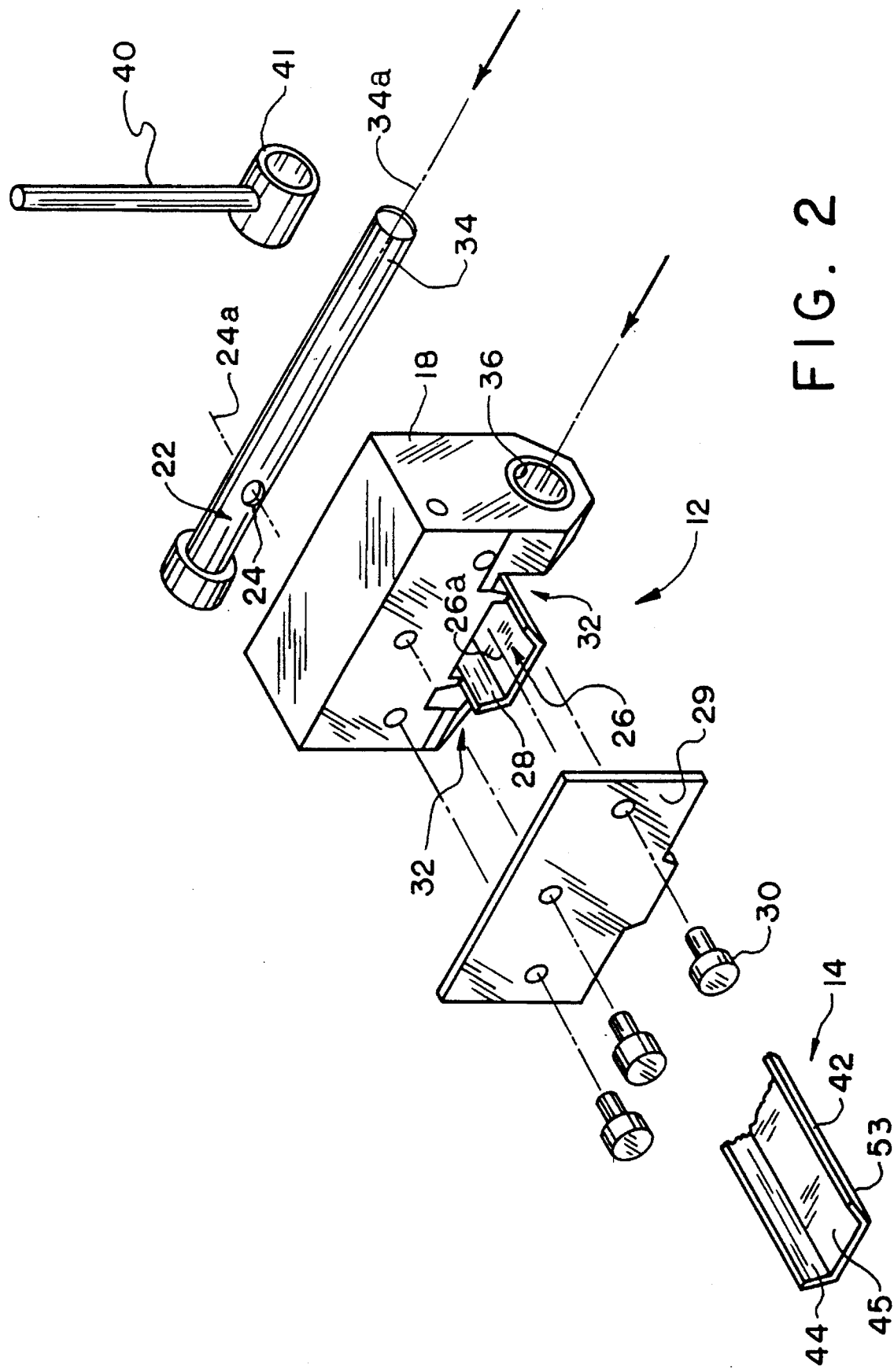
FIG. 2 is an exploded schematic perspective view of a die subassembly and some support member components of the handling system of the present invention.

As schematically illustrated in the embodiment of FIG. 1, the extruder die subassembly 12 is mounted adjacent the extruder B which is a suitable and conventional device not disclosed in detail. In FIG. 1, and in exploded condition in FIG. 2, die subassembly 12, comprises a die head 18 with a die opening 20 therein, a die feed, indicated generally at 22, a feed opening 24, having a central feed axis 24A, and a flow channel 26 through which extrudate flows to the die opening 20. As shown in FIG. 2, the flow channel 26 is defined in part by a channel-like portion 28, and by the die head. A die plate 29 is secured to the die head 18 by conventional fasteners 30. The die opening 20 is formed by portions of the die plate 29 and the channel-like portion 28 of the die head. Recesses 32 are provided in the die head on opposite sides of and adjacent to the channel-like portion 28 to permit engagement between the die head 18 and the support subassembly 14. These recesses 32 thus permit proper location of the support subassembly relative to the die head.

Extrudate flows from the extruder B to the die feed 22 and feed opening 24, into the flow channel 26 of the die head. The flow channel has a central flow channel axis 26A. The illustrated die feed 22 comprises a flow director 34 having a central axis 34A, which is transverse to both the feed axis 24A and the central flow channel axis 26A.

Extrudate material is delivered to the flow director 34 along the central flow director axis 34A, and exits the flow director through the die feed and feed opening to the flow channel 26 and die opening 20. The flow director is movably mounted within the die head in a generally cylindrical bore 36, and is rotatable within the bore about the central flow director axis 34A. It is understood that any suitable stop guide (not shown) may be provided for limiting rotation of the flow director about its central axis.

In the illustrated embodiment of FIG. 1, the invention also includes a controller, indicated generally at 38, operatively interconnected with the flow director to selectively and continuously direct the path of the extrudate exiting the die subassembly 12. As shown, the flow director 34 is rotatable within the bore 36 by the controller, which includes an interconnected lever 40. A sleeve portion 41 of the lever 40 is engaged with and surrounds the flow director 34. To vary the path of the extrudate, the lever 40 is moved to selectively rotate the flow director 34 about its central axis 34A. This moves feed opening 24 relative to the flow channel 26 to vary the extrudate path length to the die opening 20, thereby producing angles or curves in the longitudinal configuration of the extrudate A in the desired predetermined overall configuration. Additionally, it should be understood that the flow director may be moved to obtain angles or curves in the desired predetermined overall configuration by the hand of a skilled operator, or by coupling the flow director 34 to hydraulic, pneumatic or other actuators (not illustrated). Such actuators operate to rotate the flow director in response to a pattern or command received, for example, from a computer programmed to actuate the flow director to produce the desired predetermined overall configuration, e.g. a door seal with curved or rounded corners.

Using the die subassembly 12, the path and curvature of the extrudate A is thus selectively varied by sufficiently varying the length of the pathway along which the extrudate travels to the die opening 20. Varying the length of the pathway causes the extrudate to bend as it exits the die. In this embodiment, variance in the extrudate pathway is provided by rotation of the flow director 34. The resulting relative movement of the die feed 22 and the feed axis 24A with respect to the flow channel 26 and the flow channel axis 26A, progressively changes the extrudate path length through the die head to correspondingly configure the extrudate as it exits the die subassembly.

Upon exiting the die subassembly in the predetermined overall configuration, the extrudate engages the support subassembly 14 which has a predetermined overall form, corresponding generally to that of the extrudate, for receiving and supporting the curved extrudate. The support subassembly 14 comprises a metal support member 42. As illustrated in FIG. 2, the support member 42 has a generally U-shaped cross section adapted for positioning adjacent the die head 18, and for receiving and supporting curved extrudate exiting the die opening to maintain the profile and longitudinal configuration of the curved extrudate. Such support is provided, since extrudate material exiting the die opening, such as hot rubber material, unless properly supported may be distorted in its profile or overall configuration due to contact with the support subassembly or under the weight of the extrudate material itself. In the assembly 10 of FIG. 1, the extrudate is deposited internally with respect to the support member 42. In this embodiment the extrudate can be maintained under a low tension to avoid pulling the extrudate away from the corners of the support member.

In the embodiments illustrated in FIGS. 1 and 2, the support member has a cross section corresponding to that of the channel-like portion 28 in part forming the flow channel 26 of the die subassembly. The corresponding cross section of the support member 42 and channel-like portion 28, together with the opposing recesses 32 adjacent the channel-like portion, enable the support member to slidably engage the die subassembly. As shown, leg members 44 of the U-shaped support member are positioned within the recesses 32, and a base 45 of the support member abuts and engages an inner bottom surface of the base of the channel-like portion 28. In this position, extrudate exiting the die opening 20 is directly received and supported by the support member, as further illustrated in FIG. 9.

Figure 8:
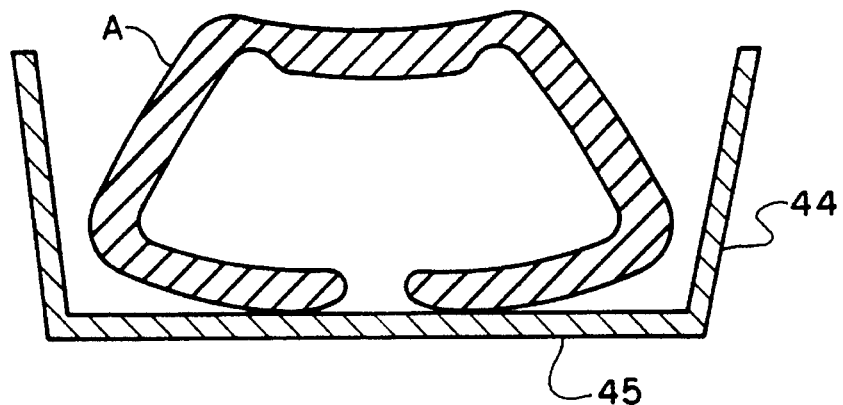
FIGS. 8, 9 and 10 are cross sections of curved extrusions in engagement with alternative exemplary support members of the handling system of the present invention.
Figure 9:
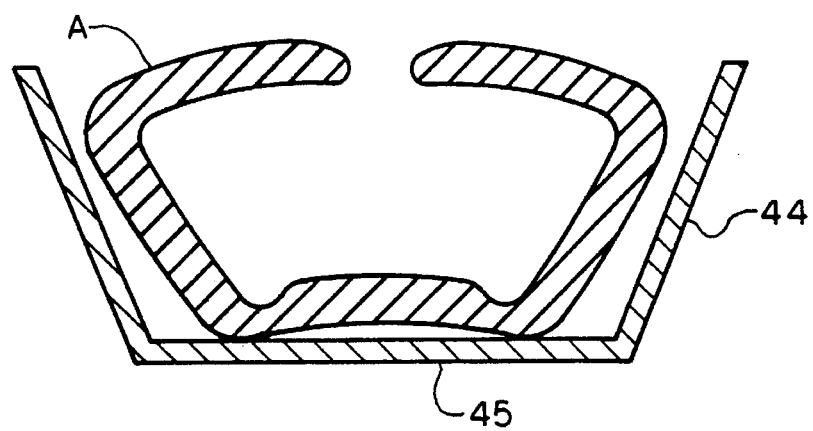

It should be understood that the die subassembly may be configured to extrude material having a profile configuration inverted from that illustrated in FIG. 9. When such a die subassembly is used, the longitudinal configuration of the support member is also inverted to a predetermined form similar, for example, to the support member 42' illustrated in FIG. 3 where extrudate is engaged externally of the support member, so that the support member form continues to correspond with the predetermined overall configuration of the curved extrudate. With this subassembly configuration, extrudate is directly received and supported by the support member as illustrated in FIG. 8.

It is additionally understood and contemplated that the die subassembly may be configured to extrude material directly onto the final and intended location for the curved extrudate product, for example, directly onto an automotive vehicle. In such circumstances, the vehicle frame has the predetermined overall form of the curved extrudate, and receives and supports the extrudate as it exits the die subassembly.

In the embodiment of FIGS. 1 and 2, the support member 42 is moved relative to the die subassembly while extrudate is being received, and until the extrudate's predetermined overall configuration is completed and received by the support member. The support member in FIG. 1 is moved by the drive subassembly 16, which includes a suitable wheel member 46 and a drive apparatus 48. The drive subassembly is additionally provided with sequentially interlocking engagement members 50 comprising cooperating timing belts 52 mounted on both the support member 42 and the wheel member 46. As illustrated in FIG. 1, the timing belt on the support member is secured to a bottom surface 53 of the base 45 of the support member. The cooperating belt is mounted on the wheel member 46 for sequential engagement of the spaced engagement members 50 with the correspondingly spaced by staggered members 50 on the belt on the support member 42.

During extrusion, the support member and wheel member are positioned such that the respective engagement members on the cooperating belts are sequentially engaged to continuously drive the support member upon rotation of the wheel member 46 in the direction of the arrow shown in FIG. 1. The support member is effectively pinched against the wheel by being dimensionally restrained by the locating recesses 32 on the die head 18, thereby to allow the support member to be continuously driven past the die head.

Using the continuous rotatable wheel member, once the predetermined overall form of one curved extrusion is completed within the support member, the extrusion of additional curved products may be undertaken upon engagement of an additional support member 42 intermediate the die subassembly 12 and drive subassembly 16. It is additionally understood that multiple die subassemblies and support members may be driven simultaneously to generate several extrusions.

The drive subassembly 16 operates to continuously maintain alignment between the support member and the curved extrudate exiting the die opening, and additionally, maintains a fixed relation between the velocity of the support member and the curved extrudate exiting the die subassembly. Operation of the drive subassembly to align and control the speed of the support member insures that any tension in the extrudate material received by the support subassembly serves to prevent any buckling which might occur within the extrudate material.

To further insure that proper engagement, support and control of the curved extrusion and subassemblies is obtained, the controller 38 and drive subassembly 16 are operatively interconnected to coordinate the curves in the extrudate leaving the die, with the curves in support member 42. For this purpose, the timing and extent of flow director rotation is coordinated with the velocity of the support member and the configuration of the support member 42, so that the extrudate is shaped in accordance with the desired predetermined configuration and received within the support member 42. Thus, when an angle or curve is formed as the extrudate exits the die opening, the corresponding angle or curve in the support member moves into position adjacent the die opening driven by the rotating wheel member 46.

During the formation of such angles or curves in the extrudate, the controller 38 or lever 40 is moved, for example, between the position shown in phantom in FIG. 1, and the position shown in solid lines. By interconnecting movement of the support member to the controller 38, to control movement of the drive subassembly 16, the curvature of the extrudate closely matches the curvature and movement of the support member. Proper velocity and positioning of the support subassembly, control of the drive subassembly velocity, and coordination of the controller to rotate the flow director in accordance with the configuration of the support subassembly, are all controlled by the system of the present invention, to insure that the extrudate is properly formed, received and supported within the support member as it exits the die subassembly.

Figure 4:
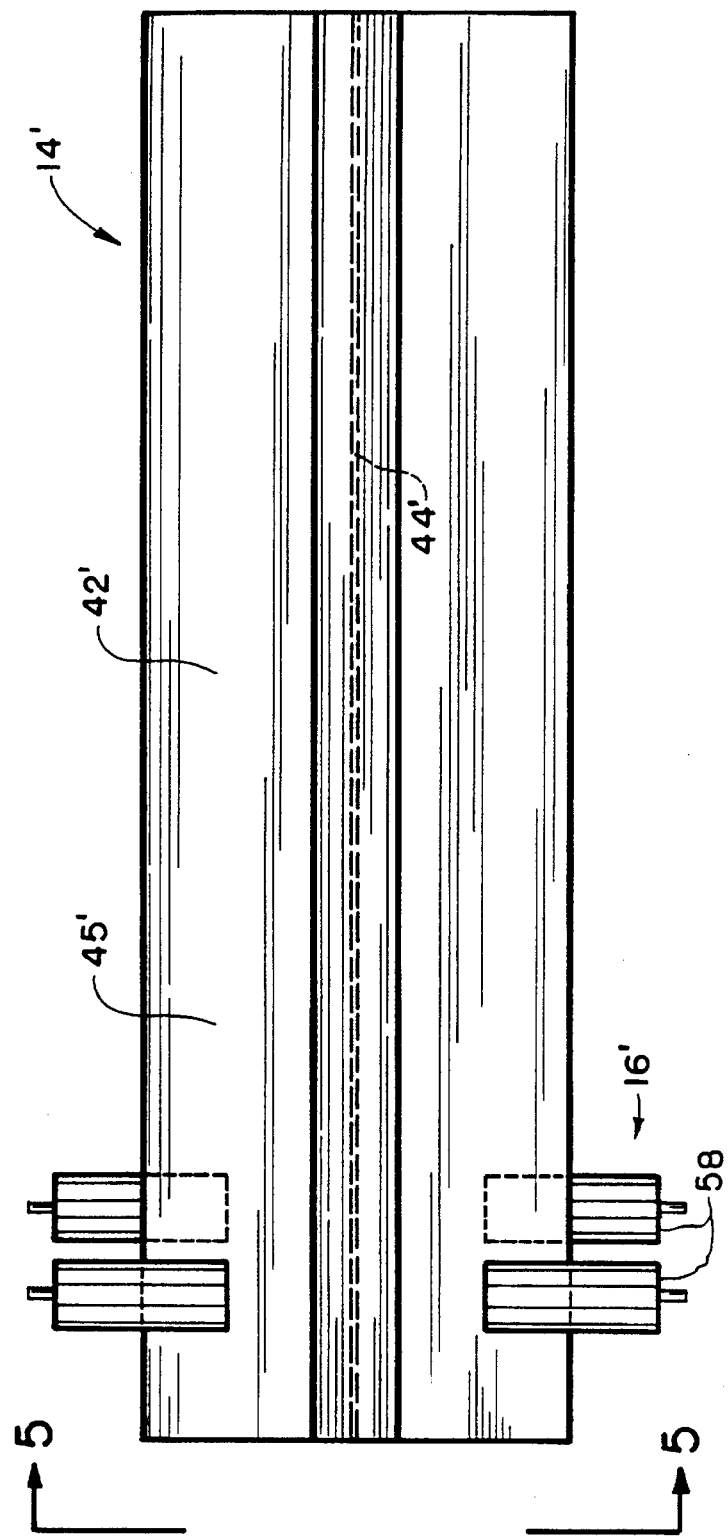
FIG. 4 is a top view of the support member of the handling system schematically illustrated in FIG. 3.
Figure 5:
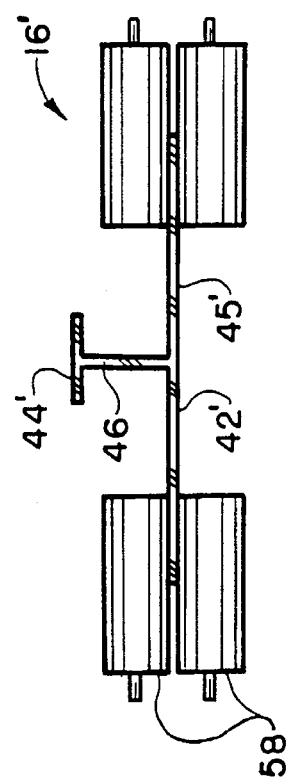
FIG. 5 is a view of the drive subassembly and support member of the handling system schematically illustrated in FIG. 3, and taken generally along the plane 5—5 of FIG. 4.

A second embodiment of the handling system of the present invention is illustrated in FIGS. 3, 4 and 5. The extruder die subassembly 12' may be similar in both construction, operation and coordination to the extruder die subassembly 12 described above in connection with the embodiment of FIGS. 1 and 2, and is thus not described in further detail.

Figure 10:
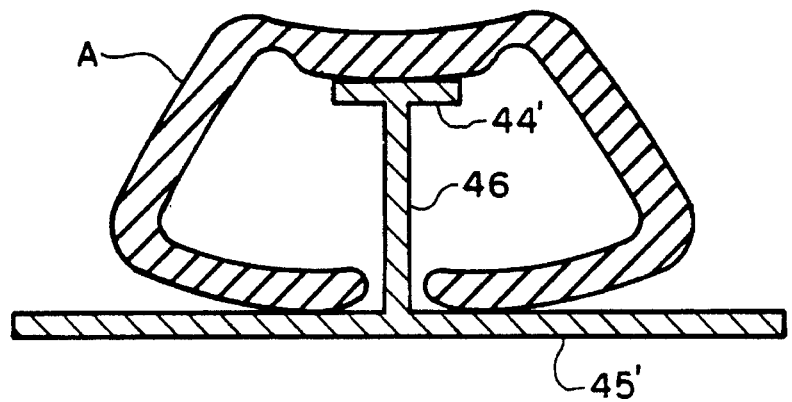

Upon exiting the die subassembly 12' in the configuration required by the ultimate predetermined overall configuration, the extrudate A engages the support subassembly 14', also having a predetermined overall form corresponding generally to that of the extrudate. The support subassembly 14' comprises a metal support member 42'. As illustrated in FIGS. 3–5, the support member has a generally I-shaped cross section, adapted for receiving and supporting extrudate exiting the die subassembly as illustrated in FIG. 10. An alternative to the use of an I-shaped cross section is the use of U-shaped side supports as shown in FIG. 8.

The I-shaped member 42' includes a base leg 45', a support leg 44' and an interconnecting web 46. The support leg 44' of the I-shaped support member is positioned adjacent the die subassembly 12' to support the extrudate A. The base member 45' has greater lateral extent for engagement with the drive subassembly 16'.

In the embodiment of FIG. 3, the support member 42' is moved relative to the die subassembly 12' while extrudate is being received. This movement is continued until the extrudate's predetermined overall configuration is completed and received by the support member. The support member 42' shown in FIGS. 3, 4 and 5 is moved by the drive subassembly 16', which comprises conventional and suitable roller members and a drive apparatus (not illustrated) which are not described in detail. Pairs of rotatable roller pinch members 58 are engaged with opposite sides of the base leg 45' of the support member 42'; one pair on each side of the base, as illustrated in FIGS. 4 and 5. During extrusion, the pairs of rollers continuously drive the support member in the direction of the arrow C illustrated in FIG. 3. As the operation of the drive subassembly 16' of the second embodiment, and its cooperation and coordination with support subassembly 14' is similar to the drive and support subassemblies 1, 14 described above with respect to the embodiment of FIG. 1, the operation and functioning of the support subassembly 14' and drive subassembly 16' are not further described.

Additionally, the embodiment of the present invention illustrated in FIG. 3 includes a second drive subassembly 17'. The second drive subassembly 17' comprises a hydraulic, pneumatic or other actuating device operatively interconnected with the die subassembly 12' to move the die subassembly 12' with respect to the moving support subassembly 14' to vary the spacing between the die subassembly 12' and the I-shaped support member 42' as needed while extruding straight and curved sections. As illustrated in FIG. 3, the drive subassembly 17' operates to move the die subassembly 12' relative to the first drive subassembly 16', or to the left as shown in FIG. 3. When straight sections of the predetermined overall extrudate configuration are being extruded as indicated by the phantom lines in FIG. 3, the spacing between the first drive subassembly 16' and die subassembly 12' are as illustrated, however, the spacing may also be changed during extrusion of a corner or curved sections, for example, to the left as viewed in FIG. 3. Such timed operation properly positions the die subassembly 12' with respect to the support member 42' during extrusion of the angled and straight sections of the extrudate material.

As with the operation of the first embodiment, the controller 38' of the second embodiment is also operatively interconnected and the timed relationship with the support member 42' and drive subassembly 16' so that the extrudate's predetermined overall configuration is properly received by the corresponding predetermined overall form of the support member 42'. In the second embodiment, it is further understood that the second drive subassembly 17' is additionally operatively interconnected with the controller 38' to control and coordinate rotary movement with that of the die subassembly 12' to extrude the proper extrudate configuration at the proper time.

In the assembly 10 of FIG. 3, the extrudate is placed externally over the support member. In this embodiment, the extrudate can be maintained under somewhat higher tension than the embodiment depositing the extrudate internally within the support member, since the extrudate travels around the corner of the support member. Care must be taken, however, to ensure that the tension is not so high that the extruded corner is flattened against the support member.

As shown in FIG. 3, during extrusion of the angles or curves in the extrudate material forming the predetermined overall configuration, the die subassembly 12' is shifted relative to the support channel 42' so that curvatures in the extrudate, corresponding to curvatures in the support member, are received and supported by proper locations on the support member 42'. Once the corners are completed, the die subassembly 12' is moved back to the position shown in phantom lines relative to the support member 42', also shown in phantom lines.

Using the continuously rotated roller members of the drive subassembly 16', once the predetermined overall configuration of one curved extrusion is completed and engaged with the support member, the extrusion of additional curved products may be undertaken upon engagement of an additional support member 42' with the drive subassembly 16' intermediate the die subassembly 12'.

Figure 6:
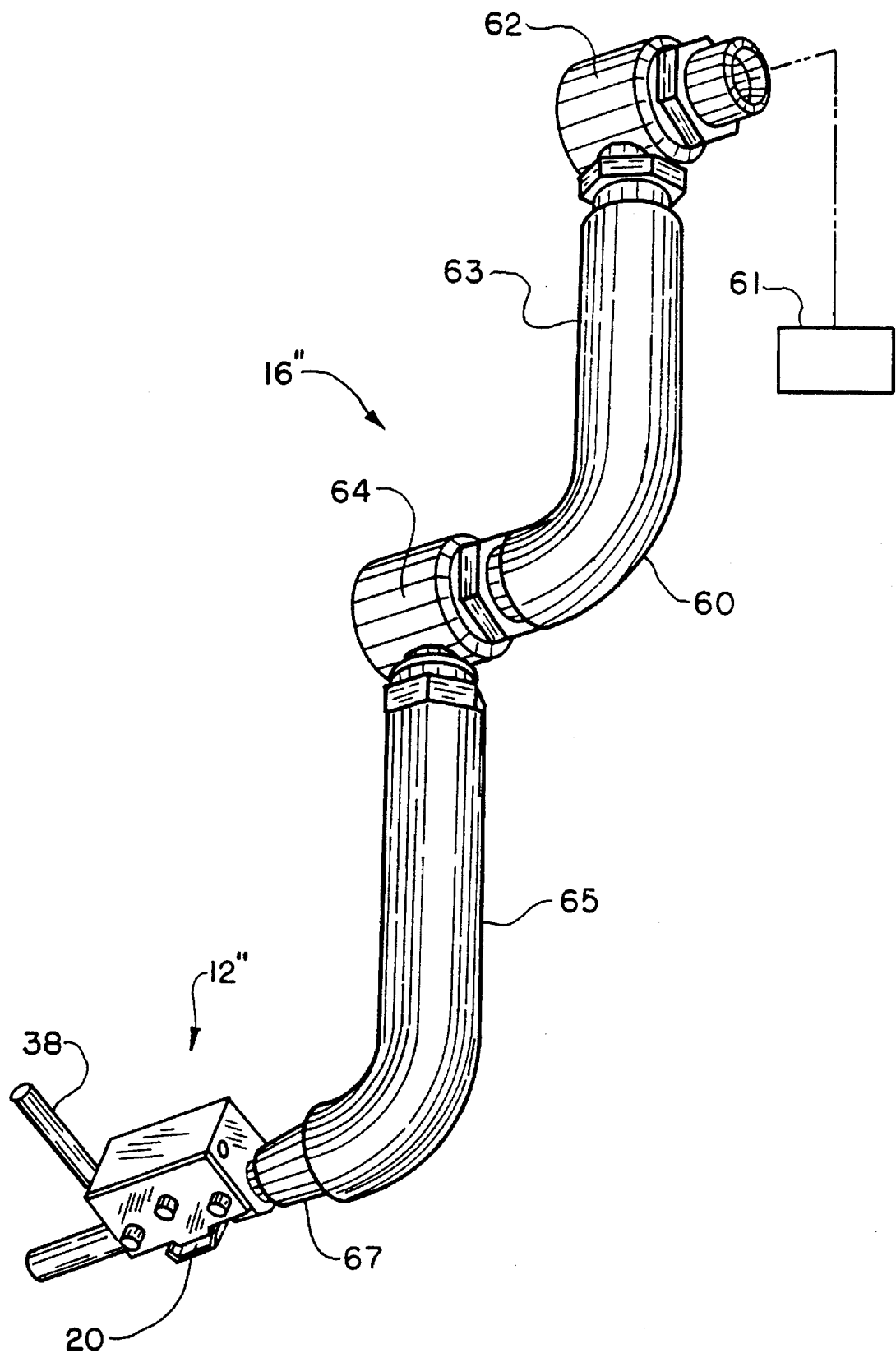
FIG. 6 is a perspective of an alternative embodiment of a die and drive subassembly of the handling system of the present invention.

A third embodiment of the handling system of the present invention is illustrated in FIGS. 6 and 7. The extruder die subassembly 12" illustrated in FIG. 6 is similar in both construction and operation to the extruder die subassembly 12 described above in connection with the embodiment of FIGS. 1 and 2, and is not further described in connection with the third embodiment. Additionally, the support subassembly 14" is identical to the support subassembly of FIG. 1, and comprises a U-shaped metal support member 42".

The embodiment of the present invention illustrated in FIGS. 6 and 7 differs from the prior embodiments in that the drive subassembly 16" is operatively interconnected with the extruder die subassembly 12" to move the extruder die subassembly with respect to the support member 42" during extrusion.

As illustrated in FIGS. 6 and 7, the drive subassembly 16" comprises a jointed conduit arm 60 having multiple flexible joints which are movable by a variety of conventional robotic, pneumatic, hydraulic or other control acuators schematically illustrated at 61. The drive subassembly 16" is positioned intermediate the extruder B and the die subassembly 12". As shown, the drive subassembly 16" includes a first rotary union 62 connected to the extruder, a first conduit section 63 extending between the first rotary union 62 and a second rotary union 64, and a second conduit section 65 extending between the second rotary union 64 and a third rotary union 67, secured to the die subassembly 12". The pivotal movement of the second rotary union 64 can occur anywhere along the arc 66 described by the pivotal movement of the first conduit section 63 about the first rotary union 62 connected to the extruder B. This arcuate degree of freedom allows the jointed conduit arm to articulate to accomodate changes in the shape of support member 42".

As in prior embodiments, the movement of the controller 38" is coordinated with the movement of the die subassembly 12" and the configuration of the support member to sequentially curve the extrudate in conformance with the curves in the support member in alignment therewith. In the assembly 10 of FIGS. 6 and 7, however, extrudate A may be deposited either internally or externally of the support member.

The articulated motion of the multiple Joints of the conduit arm 60 of the drive subassembly 16" during extrusion is illustrated schematically in FIG. 7 of the drawings. In the preferred from of the third embodiment, the lengths of the conduit sections 63 and 65 between the joints of the arm are similar to maximize the area of reach accessible to the die subassembly 12". Additionally, under computer command control, the jointed arm drive subassembly extrudes material to the support subassembly 14" in both forward and reverse directions, as well as in numerous predetermined overall configurations.

It will be apparent from the foregoing that changes may be made in the details of construction and configuration without departing from the scope and spirit of the invention as defined in the following claims.

We claim:

1. An assembly for processing extrudate material into an extrudate of a predetermined overall configuration and profile, said assembly comprising:

a die assembly for extruding such extrudate of a predetermined overall configuration and including means for controlling extrudate profile and flow director means having a feed opening and a die opening for selectively varying the path of the extrudate within the die assembly by rotating either of said openings with respect to said other opening to produce said predetermined overall configuration, a support means of predetermined overall form and cross-section for receiving the extrudate and maintaining its profile and configuration, and means to drive either the die assembly or the support means relative to the other while the extrudate is being received in predetermined overall configuration within the support means.

2. An assembly for processing extrudate material into a predetermined overall configuration and handling such processed extrudate material, said assembly comprising, an extruder die subassembly, an extrudate support subassembly and a drive subassembly, said extruder die subassembly includes a die having a die opening, a die feed and a flow directors said die having means on an external surface thereof for positioning said extrudate support subassembly adjacent said die opening, said die feed interconnected with said die for supplying extrudate to said dies and said flow director movably mounted within said die to selectively control the path of extrudate flow exiting the die by rotating said die feed with respect to said die opening, said extrudate support subassembly having a support means positioned adjacent said die and configured for receiving and supporting extrudate material exiting said die to maintain the profile and longitudinal configuration of the extrudate, and said drive subassembly interconnected with one of said extruder die or extrudate support subassemblies to continuously maintain alignment between the one extruder die or support subassembly in accordance with the extrudate exiting the dies to move the one extruder die or extrudate support subassembly with respect to the other subassembly, and to maintain the velocity of the one moving extruder die or extrudate support subassembly in fixed relation to the velocity of the exiting extrudate.

3. An assembly as set forth in claim 2, wherein said first and second drive assemblies are operatively interconnected to move the extruder die and extrudate support subassemblies to accomodate curved portions of extrudate exiting the die and engaging the extrudate support subassembly.

4. An assembly for receiving an at least partially curved extrudate of a predetermined overall configuration and profile exiting an extruder, and an extruder die assembly, said assembly comprising, a support member having a base and a support wall having a predetermined overall form corresponding to, engaging, and supporting such at least partially curved extrudate and maintaining such predetermined overall configuration and profile, of such at least partially curved extrudate, and a drive means removably interconnected with the support member for positioning the support member relative to the at least partially curved extrudate exiting an extruder, and moving and aligning the support member in conformance with an at least partial curvature of exiting extrudate at a velocity greater than the velocity of curved extrudate exiting an extruder, said drive means comprising pairs of drive rollers and said support member comprising a member having an I-shaped or channel shaped cross-sectional configuration, said pairs of drive rollers engaged with one surface of one leg of said support member on a surface of the leg not engaging the extrudate to drive said support member upon movement of said drive rollers.

5. An assembly for processing and handling curved extrudate material of a predetermined configuration and profiles said assembly comprising, an extruder die subassembly, and extrudate support subassembly and a drive subassembly, said extruder die subassembly including a die, a die feed and a flow director, said die having means for locating said support subassembly adjacent said die, said die feed interconnected with said die for supplying extrudate to said die, and said flow director movably mounted within said die to selectively control the path of extrudate flow and extrudate curvature exiting by die by rotating the flow director with respect to the die, said extrudate support subassembly including a support member having a base and a support wall for engaging and supporting curved extrudate, said support member located adjacent said die to receive curved extrudate material exiting the die and to maintain the profile and longitudinal configuration of the curved extrudate, and a drive subassembly interconnected with said extruder die subassembly to move the extruder die subassembly with respect to the support member and maintain the velocity of the moving extruder die subassembly greater than the velocity of exiting curved extrudate.

6. The assembly of claim 5, wherein said support member has a predetermined overall form corresponding to the configuration of the curved extrudate exiting the die.

7. The assembly of claim 6, further comprising means to control said flow director to direct the path of extrudate flow in conformance with the predetermined overall form of the support member.

8. The assembly of claim 7, wherein said drive subassembly comprises a movable jointed arm having the die subassembly mounted on a terminal end thereof for depositing curved extrudate exiting the die on the support member in conformance with the predetermined overall form of the support member.

9. A method for processing at least partially curved extrusions into a predetermined profile and overall configuration, comprising the steps of:

a) operating an extruder die subassembly to manufacture extrudate having such predetermined profile;

b) varying the path of the extrudate as it leaves the extruder die assembly by rotating either a feed opening or a die opening of the extruder die assembly with respect to the other to obtain the predetermined overall configuration;

c) moving a support member or the extruder die assembly relative to the other during extrusions said support member having the predetermined overall configuration of the extrudate to receive the extrudate as it leaves the extruder die assembly;

d) supporting the extrudate on the support member to maintain the profile and longitudinal configuration of the extrudate; and e) receiving extrudate on the support member until the entire predetermined overall configuration is completed.

10. The method for processing extrusions as set forth in claim 9, further comprising the step of coordinating the variance in the path of the extrudate and the movement of the support member or extruder die assembly, to produce curved extrudate sections conforming with corresponding curved sections in the predetermined overall form of the support member.

* * * * *